3,142,702
PROCESS FOR ISOLATING FREE α-AMINO ACIDS FROM CUPRIC COMPLEX SALTS THEREOF
Natsuo Sawa, Yoichi Tsujino, and Shigeru Kishizoe, Kitajima-machi, Itano-gun, Tokushima Prefecture, and Tetsuji Yoshida, Tokushima, Tokushima Prefecture, Japan, assignors to Toho Rayon Kabushiki Kaisha, Tokyo, Japan, a corporation of Japan
No Drawing. Filed May 28, 1962, Ser. No. 197,898
Claims priority, application Japan July 25, 1961
3 Claims. (Cl. 260—534)

The present invention relates to a process in which cupric complex salts of certain α-amino acids are reacted with hydrogen gas by heating in a liquid-gas heterogeneous phase to isolate α-amino acids in their free form from complex salts thereof conveniently and efficiently.

The reaction of the present invention proceeds generally according to the following equation:

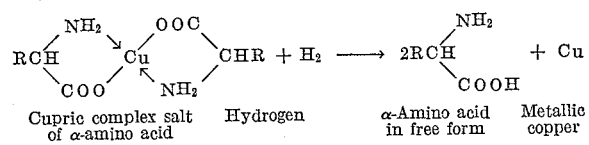

wherein R generally represents a hydrogen atom or residues such as hydroxy, alkyl, hydroxyalkyl, sulfur contained alkyl, aryl, hydroxyaryl, imidazolyl-methyl, aminoalkyl or carboxyl-alkyl group, excepting

—CH(NH₂)COOH group from cupric-complex forming α-amino acids which are considered to be divided into two groups, namely, —R and —CH(NH₂)COOH.

Up to this time for the preparation of α-amino acids in free form for example, the following typical procedure, has been adopted widely:

For instance, cupric complex salt of a certain α-amino acid is synthesized at first, dissolved in water and then treated with, for example, hydrogen sulfide to remove its copper component from the salt in the form of water insoluble cupric sulfide. Subsequently, the resulting reaction-mixture is filtered and condensed to separate the free α-amino acid.

In the procedure described above, however, the following troubles will result from the treatment with hydrogen sulfide.

(1) It is comparatively difficult to filter off smoothly the formed cupric sulfide.

(2) Various, uselessly complicated side-reactions occur because hydrogen sulfide and so-called resinous by-products tend to form which disturb subsequent procedures for further purification.

(3) The resulted filtrate from the treatment with hydrogen sulfide still contains colloidal sulfur that is difficult to eliminate and consequently resulting in the side reactions which may disturb the further purification [cf. Jap. patent publication No. 2,964 (1959)].

Owing to the process of the present invention, however, the resulted solution of the free α-amino acid is sufficiently so clean that the product of comparatively high purity can be obtained without any difficulty by the following simple condensation and recrystallization, while copper component is isolated as fine powdery metallic copper which is filtered off from the solution with ease.

Further, the process of the present invention can be carried out similarly in both the cases in which the cupric-complex-salt of α-amino acid is either soluble or difficultly soluble in the liquid medium used.

Further explanation on the reaction of the present invention is as follows:

Cupric complex salt of a certain α-amino acid together with a liquid medium (for example, water) are charged and sealed in an autoclave of stainless steel, then hydrogen gas in excess of the theoretical amount is forced into the autoclave.

The autoclave is heated under agitation. The absorption of hydrogen gas is commenced as soon as the reaction-temperature reaches approximately 140° C., and then the reaction is accelerated at 150° C. and soon ceased. The duration for the reaction is less than 1 hour. The resulting reaction mixture in the autoclave is then filtered to separate metallic copper from the filtrate containing the isolated α-amino acid and the further purified product is obtained from the filtrate with ease by usual procedures.

In the reaction described above, liquid mediums are not necessarily capable of dissolving the free α-amino acid. It is more advantageous, however, to use mediums capable of dissolving α-amino acids, during further treatments (for example, filtration). For instances, benzene, methanol, water containing either a certain acidic substance (for example, acetic acid) or a basic substance (for example, ammonia) therein and water alone may be used. Among those mediums, however, water used alone is best.

High pressure of hydrogen gas above the pressure sufficient to maintain the medium in liquid state at the reaction temperature of approximately 150° C. is not necessary for the reaction described above. The reaction is effected in an autoclave on account of high pressure of hydrogen gas.

Some of the physical properties of the α-amino acids obtained by the reaction of the present invention are shown as follows:

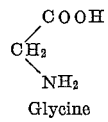

Glycine

Melting point, 239–240° C. (decomp.). N-benzoyl deriv.: melting point, 189–190° C.

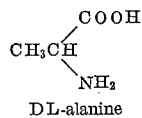

DL-alanine

Melting point, above 260° C. Phenyl urea deriv.: melting point, 167° C.

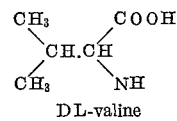

DL-valine

Melting point, above 280° C. N-benzoyl deriv.: melting point, 130–131° C.

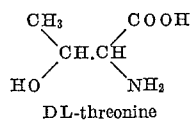

DL-threonine

Melting point, 225–226° C.

*Example 1.*—Glycin (35.0 gm.), malachite (73.0 gm.) and water (100.0 gm.) were mixed and heated on a water bath for 2 hours. The reaction mixture obtained was filtered while hot, and the obtained filtrate was then vacuum-condensed on a water bath and allowed to cool. Crude cupric complex salt of glycine, crystallized from the filatrate treated as above, was collected, washed with methanol and dried in vacuum. Thus, pure cupric complex salt (41.5 gm.) of glycine was obtained. Cupric complex salt (41.5 gm.) of glycine and water (220.0 gm.) were charged in a stainless-steel autoclave, capacity of which was 330 cc. In the next step, hydrogen gas was compressed until the initial pressure of 110 atm. (at an ordinary temperature) was attained. While the autoclave was heated under shaking, the exhaustion of hydrogen gas occurred as soon as the reaction-temperature of 150° C. was attained and the reaction contained for 22 minutes and ceased.

The hydrogen pressure after the exhaustion of hydrogen gas was 45 atm. (theo. 44 atm.) at 0° C.

Fine powders of metallic copper (11.1 gm.; approximately 96.5% yield) and a transparent but slightly colored solution (215.0 cc.) of glycine were separated from the resulting reaction-mixture by filtration. By vacuum condensation of the resulted filtrate, slightly brownish crystals of crude glycine (24.4 gm., approximately 90% yield) were obtained.

Colorless crystals of purified glycine (M.P. 239–240° C.) were obtained from the crude crystals, recrystallized once from mixed water-methanol solvent.

*Example 2.*—Cupric complex salt of glycine (5.1 gm.), derived from free glycine (4.5 gm.) in the similar procedure as in Example 1, and 200.0 gm. water were charged in the same autoclave as above and hydrogen gas was compressed until the initial pressure of 65 atm. was attained. The reaction was performed at 170–180° C., for 2 hours under shaking. Crystal of crude glycine (3.0 gm.) was obtained in the similar procedure as in Example 1.

*Example 3.*—Cupric complex salt of DL-alanine, derived from 5.0 gm. of free DL-alanine similarly as Example 1, and 230.0 gm. water were charged in the same autoclave as above. Hydrogen gas was compressed until the initial pressure of 65 atm. was attained. The reaction was performed at 170–180° C. for 2 hours under shaking. Crystals (4.9 gm.) of crude DL-alanine were obtained in a similar procedure as in Example 1.

*Example 4.*—Cupric complex salt of DL-valine, derived from 5.0 gm. of free DL-valine similarly as Example 1, and 200.0 gm. water were charged in the same autoclave as above. Hydrogen gas was compressed until the initial pressure of 65 atm. was attained. The reaction was performed at 140° C. for 2 hours under shaking. Crystals (3.0 gm.) of crude DL-valine were obtained in a similar procedure as in Example 1.

*Example 5.*—Cupric complex salt of DL-threonine, derived from 5.7 gm. of free DL-threonine similarly as Example 1, and 230.0 gm. of water were charged in the same autoclave as above. Hydrogen gas was compressed until the initial pressure of 85 atm. was attained. The reaction was performed at 150° C. for 2 hours under shaking. Thus metallic copper (1.4 gm.) and transparent but very slightly colored solution of DL-threonine was obtained. By vacuum condensation and dryness of the solution crystals (5.0 gm.) of crude DL-threonine, from which colorless crystals of DL-threonine (M.P. 223–224° C.) was recrystallized from mixed water-methanol solvent, were obtained.

*Example 6.*—DL-aspartic acid (5.0 gm.) and cupric ammonium solution where were obtained from malachite (=cupric carbonate) (30.0 gm.) and 28% aqueous ammonium solution (200.0 cc.) were reacted at room temperature for 4 hours. The resulting reaction mixture was charged in the same autoclave as above, without any further treatment. Hydrogen gas was compressed until the initial pressure of 75 atm. was attained. The reaction was carried out at 150° C. for 2 hours under shaking. Crystal (3.0 gm.) of crude DL-aspartic acid was obtained in the similar procedure as in Example 1.

*Example 7.*—Cupric complex salt (5.1 gm.) of glycine and water (30.0 gm.) were charged in the same autoclave as above. Hydrogen gas was compressed until the initial pressure of 5 atm. was attained. The reaction was performed at 160° C. for 5 hours under shaking. Crystals (3.0 gm.) of crude glycine was obtained in the similar procedure as in Example 1.

*Example 8.*—Cupric complex salt (40.0 gm.) of glycine and methanol (220.0 cc.) were charged in the same autoclave as above. Hydrogen gas was compressed until the pressure of 74 atm. was attained. The reaction was performed at 140° C. for 4 hours. The reaction, however, proceeded only as much as 75% of the decoppering reaction and stopped. Thereafter the hydrogen absorption proceeded but slowly when heated at higher temperature.

What we claim is:

1. A process for the isolation of free α-amino acid from cupric complex salts thereof represented by a following formula:

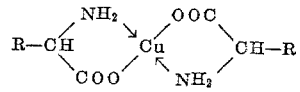

wherein R is selected from the group consisting of a hydrogen atom, alkyl, hydroxyalkyl and carboxyalkyl, comprising reacting said cupric complex salts with hydrogen gas in a liquid medium, filtering the reaction mixture to separate metallic copper from filtrate containing the isolated α-amino acid.

2. A process as set forth in claim 1, wherein said liquid medium being capable of dissolving the isolated α-amino acid and being selected from a group consisting of pure water, water containing an acidic substance, water containing a basic substance, benzene and methanol.

3. A process as set forth in claim 1, wherein said hydrogen gas is reacted under such pressure to keep the liquid medium used in a liquid form approximately at a temperature of 150° C.

References Cited in the file of this patent
UNITED STATES PATENTS

| | | |
|---|---|---|
| 3,059,026 | Miyamae | Oct. 16, 1962 |
| 3,068,281 | Fujii | Dec. 11, 1962 |

OTHER REFERENCES

Smith: Chemistry and Industry, November 10, 1956, pages 1284–1291 (TPI S63).